(12) United States Patent
Homa

(10) Patent No.: US 6,947,650 B1
(45) Date of Patent: Sep. 20, 2005

(54) LONG WAVELENGTH, PURE SILICA CORE SINGLE MODE FIBER AND METHOD OF FORMING THE SAME

(75) Inventor: Daniel Scott Homa, Bloomsbury, NJ (US)

(73) Assignee: Luna Energy LLC, Blacksburg, VA (US)

( * ) Notice: Subject to any disclaimer, the term of this patent is extended or adjusted under 35 U.S.C. 154(b) by 0 days.

(21) Appl. No.: 10/840,130

(22) Filed: May 6, 2004

(51) Int. Cl.[7] ............ G02B 6/16; G02B 6/02; G02B 6/00
(52) U.S. Cl. .............. 385/123; 385/126; 385/144
(58) Field of Search ................. 385/126–128

(56) References Cited

U.S. PATENT DOCUMENTS

| | | | |
|---|---|---|---|
| 4,439,007 A | 3/1984 | Lazay et al. | |
| 4,447,125 A | 5/1984 | Lazay et al. | |
| 4,596,589 A | 6/1986 | Perry | |
| 4,691,990 A | 9/1987 | Cohen et al. | |
| 5,596,668 A | 1/1997 | DiGiovanni et al. | |
| 5,942,296 A | 8/1999 | Oh et al. | |
| 6,280,850 B1 | 8/2001 | Oh et al. | |
| 6,307,994 B1 | 10/2001 | Pack et al. | |
| 6,347,174 B1 * | 2/2002 | Onishi et al. | 385/122 |
| 6,529,666 B1 | 3/2003 | Dultz et al. | |
| 6,556,755 B2 * | 4/2003 | Tsukitani et al. | 385/123 |
| 2002/0108403 A1 | 8/2002 | Dong et al. | |
| 2003/0110811 A1 | 6/2003 | Nunome et al. | |
| 2003/0145629 A1 | 8/2003 | Anderson et al. | |
| 2003/0147619 A1 | 8/2003 | Anderson et al. | |
| 2005/0063663 A1 * | 3/2005 | Anderson et al. | 385/142 |

OTHER PUBLICATIONS

Hecht, J. (2002) Understanding Fiber Optics, 4th Edition, p. 135-137, New Jersey, Ohio, Prentice Hall.*

* cited by examiner

*Primary Examiner*—Brian Healy
*Assistant Examiner*—Charlie Peng

(57) ABSTRACT

An optical fiber suitable to support single mode optical transmission at longer wavelengths (e.g., 1550 nm) is formed to comprise a pure silica core region and a "down doped" cladding layer. The core region is defined as having a diameter d and the cladding layer is defined has having an outer diameter D. In accordance with the present invention, single mode propagation will be supported when D/d>8.5, and is preferably in the range of 9–10.

9 Claims, 2 Drawing Sheets

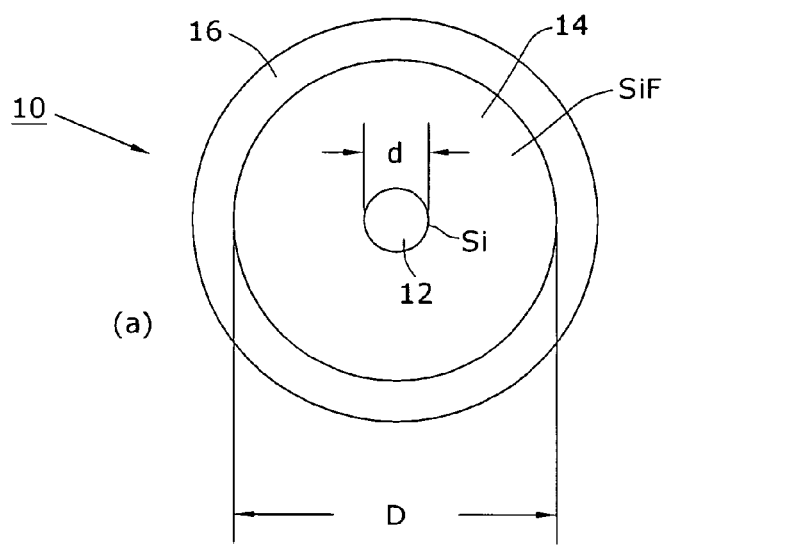
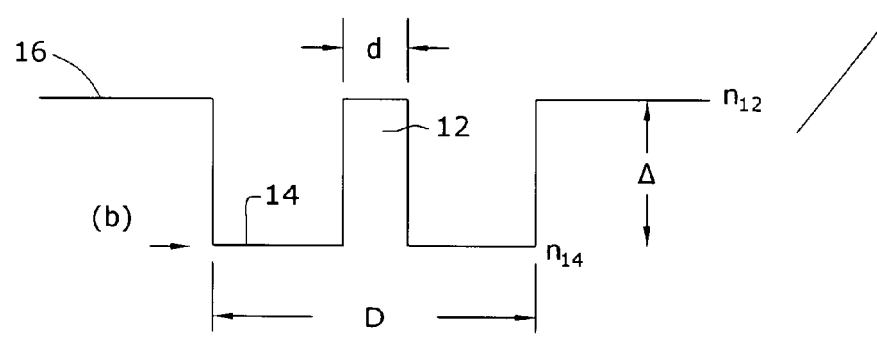
FIG. 1
FIG. 2
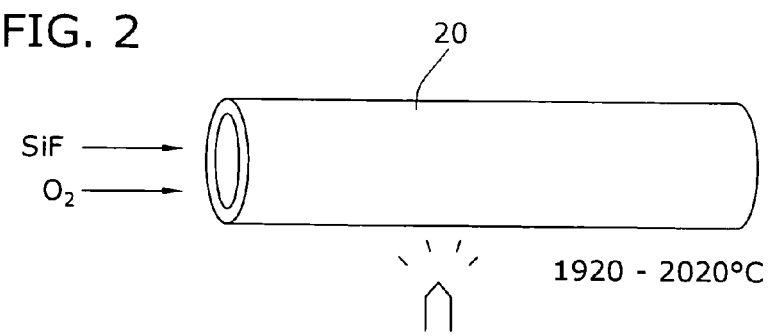

LONG WAVELENGTH, PURE SILICA CORE SINGLE MODE FIBER AND METHOD OF FORMING THE SAME

TECHNICAL FIELD

The present invention relates to a single mode fiber for long wavelength (e.g., λ=1550 nm) applications and, more particularly, to a single mode fiber comprising a pure silica core and a relatively thick cladding such that the ratio of the diameter of the cladding (defined as "D") to the diameter of the core (defined is "d") is greater than 8.5.

BACKGROUND OF THE INVENTION

In single mode optical fibers, a significant fraction of the total guided energy is not confined to the core, and the "tail" of the power distribution extends a considerable distance into the cladding material. Since the substrate (or sleeve) tube material outer cladding is typically less pure (and therefore much more lossy) than the cladding material, it is necessary to ensure that no significant fraction of the total power propagates in the substrate- or tube-derived material.

In one type of prior art single mode fiber, referred to as a "depressed cladding" fiber, the effective refractive index of the cladding material is chosen to be substantially less than the refractive index of the core. In most of these depressed cladding prior art designs, the core region is "up doped" and the cladding region is "down doped" so as to obtain the largest difference in refractive index with the smallest overall fiber diameter. The ratio of the cladding diameter D to the core diameter d, is used in determining various performance parameters of optical fiber made from the perform. For example, to obtain optical fiber having desired transmission characteristics, the D/d ratio should be within an acceptable, but relatively narrow, range of values. The single mode cut-off wavelength must also be taken into account in the determination of the appropriate D/d value. The cut-off wavelength is the wavelength below which the optical fiber behaves as a step-index multimode fiber and above which behaves as a single mode fiber. Also, the D/d ratio affects the mode field diameter (MFD) which is a measure of the width of the light intensity in a single mode fiber—also referred to as the "spot size". In most cases, it is desired to maintain the ratio D/d less than 2.5 While this value is acceptable for most short wavelength arrangements, long wavelengths (e.g., 1550 nm) cannot be supported in such an arrangement.

In the case where a depressed clad/pure silica core fiber is used (i.e., cladding is doped to exhibit a refractive index less than silica, a non-negligible fraction of the total power will to leak to the outer cladding. The fiber would thus have relatively high loss, even if the outer cladding has a low absorption loss, comparable to that of the deposited cladding material. This type of loss is referred to as a "leaky mode" loss, since the radiation propagating in the outer cladding is unguided and will "leak" away. Leaky mode loss can be avoided by depositing a significantly thick cladding layer.

Therefore, for a pure silica core fiber (such as fabricated by MCVD), the depressed cladding which provides the index difference necessary for a waveguide must be large enough to contain the single mode, while not allowing the energy to leak from the fiber and drastically increase attenuation at the specified wavelength. Furthermore, the perform must be designed to have a cutoff wavelength that is relatively close to the operating wavelength to adequately contain the mode. Further, the depressed cladding material should have a thickness sufficient to contain the operating wavelength mode without suffering from huge bending loss.

SUMMARY OF THE INVENTION

The present invention addressed the need remaining in the prior art and relates to a single mode fiber for long wavelength (e.g., λ=1550 nm) applications and, more particularly, to a single mode fiber comprising a pure silica sore and a relatively thick cladding such that the ratio of the diameter of the cladding (defined is as "D") to the diameter of the core (defined as "d") greater than is approximately 8.5. By "approximately", it is to be understood that the value may be somewhat less than 8.5 (for example, approaching 8) or somewhat greater than 8 (for example, 9 or 10). An upper bound is not critical as long as the desired single mode propagation at relatively long wavelengths is achieved.

In accordance with the present invention, the core, is formed from pure silica, with a relatively thick cladding comprising fluorine-doped silica. The addition of the fluorine species serves to reduce the effective refractive index of the cladding material with respect to the pure silica core material. Using conventional MCVD processes, approximately 15–90 layers of fluorine-doped silica are deposited within a glass perform tube, with the core material thereafter deposited over the deposited layers of fluorine-doped silica.

Advantageously, by forming a pure silica core fiber with such a large D/d ratio, the fiber will be radiation resistant—a necessary feature for some applications, at standard telecommunication operating wavelengths (usually less than 1700 nm). The fiber has also been shown to be hydrogen resistant (i.e., performs well in a hydrogen environment), and therefore, exhibits improved resistance to the hydrogen-induced loss typically seen in harsh environments ("downhole" fibers, for example).

Other and further advantages and features of the present invention will become apparent during the course of the following discussion and by reference to the accompanying drawings.

BRIEF DESCRIPTION OF THE DRAWINGS

Referring now to the drawings,

FIG. 1 illustrates a cross-sectional view and associated refractive index profile for a single mode, long wavelength fiber formed in accordance with the present invention; and FIGS. 2–5 illustrate an exemplary process for forming the single mode, long wavelength fiber of the present invention.

DETAILED DESCRIPTION

FIG. 1 contains a cross-sectional view (FIG. 1(a)) and associated refractive index profile (FIG. 1(b)) of a long wavelength, single mode fiber 10 formed in accordance with the present invention. The fiber comprises a relatively small diameter pure silica core region 12, where the diameter of core region 12 is referred to as "d" in the illustrations. A relatively thick cladding layer 14 surrounds core region 12, where the diameter of cladding layer 14 is defined as "D" in the illustrations. In accordance with the present invention, cladding layer 14 is doped with fluorine, which functions to lower the effective refractive index of the material, ensuring that most of the propagating signal will remain in the core region. A "tube" layer 16 is shown as surrounding cladding layer 14, where tube layer 16 may also comprise pure silica. FIG. 1(b) illustrates the refractive index profile for fiber 10, where the difference between the refractive index of the core (defined as $n_{12}$) and the refractive index of the cladding (defined as $n_{14}$) is shown as "Δ". Since the inclusion of fluorine in the cladding layer functions to "depress" the refractive index of the cladding, most of the propagating single mode optical signal will be maintained within core region 12. In accordance with the present invention—and contrary to conventional fiber fabrication parameters—the ratio D/d is controlled to be relatively large, greater than 8.5, and preferably in the range of 9 to 10. For example, for a 10 micron fiber pure silica core, a fluorine-doped cladding would necessary exhibit an outer diameter greater than 85 microns, and preferably in the range of 90 to 100 microns.

Figure 3:
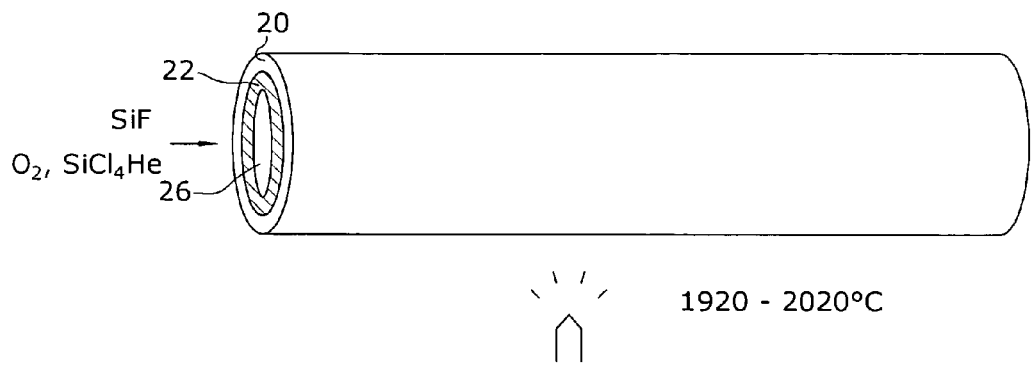

FIGS. 2–5 illustrate an exemplary process sequence that may be used to form the long wavelength, single mode fiber of the present invention. The process, as shown in FIG. 2, begins with an exemplary glass tube 20 used to fabricate an optical fiber preform using the well-known "modified chemical vapor deposition" (MCVD) technique. Cladding material 22 is then deposited on the inner wall 24 of tube 22, as shown in FIG. 3. The cladding is deposited in a number of layers so as to form the desired thickness for the final preform structure. In some cases as many as 15–90 separate layers of fluorine-doped silica will need to be deposited to form the thick cladding region. As mentioned above, the desire is to obtain a D/d ratio of approximately 8.5. The D/d value may be somewhat greater than 8.5, but values larger than (for example) 10 are not considered to further improve the operating characteristics of the inventive fiber. In particular, the number of layers is controlled (in combination with various process parameters) with respect to the predetermined diameter d of the core region to obtain the desired D/d ratio. During processing, if it is discovered that the cladding is too thin, an HF etch may be used to remove a portion of the tube material. Depending on the length of glass tube 20, the deposition temperature is preferably within the range of approximately 1920–2020° C. The fluorine-doped cladding is formed from precursors of SiF, $O_2$, $SiCl_4$ and He. Depending on the equipment used, half of the layers can be deposited in one direction (e.g., from left to right), with the other half then deposited in the opposite direction (e.g., from right to left) so as to "balance" any irregularities in the geometry of the relatively thick deposited cladding material.

Figure 4:
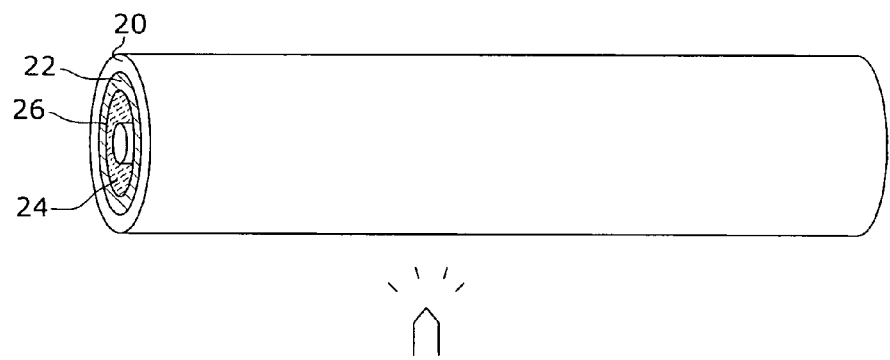
Figure 5:
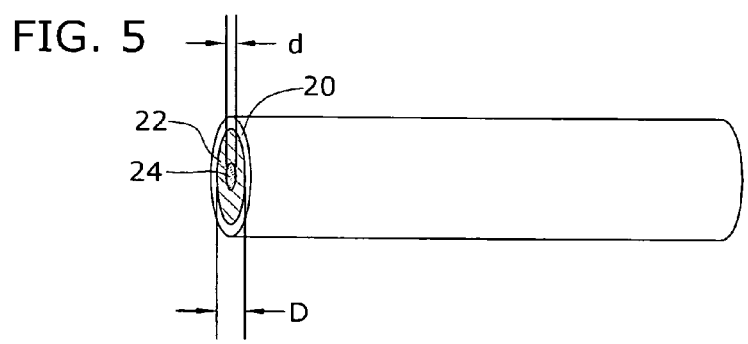

Once a sufficient amount of fluorine-doped cladding material 22 has been deposited, silica core material 24 is deposited on the inner wall 26 of cladding material 22, as shown in FIG. 4. After core material 24 has been deposited, the tube is collapsed to form the preform, as illustrated in FIG. 5. In accordance with the present invention, the thickness of cladding material 22 (D) and the thickness of core material 24 (d) are controlled such that D/d>8.5. Accordingly, by using a pure silica core region of relatively small diameter and a surrounding relatively thick cladding, a single mode, long wavelength signal (e.g., λ=1550 nm) can be supported.

In an alternative embodiment, a first set of cladding layers (for example, the first 20–30 layers) that are deposited may comprise phosphorous (or boron) as well as fluorine, followed by the deposition of "fluorine only" cladding, where the presence of only fluorine will maintain the hydrogen stability, as mentioned above, while not compromising the attenuation of the fundamental mode. Moreover, although MCVD is a preferred techniques for forming the fiber preform, any other technique that is capable of forming a fiber having the desired D/d ratio may be used, such as OVD or VAD.

Indeed, the present invention is intended to be limited in scope only by the claims appended hereto.

What is claimed is:

1. An optical fiber for supporting single mode transmission of a long wavelength signal, the optical fiber comprising:
   a pure silica core region of diameter d; and
   a surrounding fluorine-doped cladding region having a diameter D, where D/d is approximately 8.5.

2. An optical fiber as defined in claim 1 wherein the fiber further comprises a surrounding tube layer.

3. An optical fiber as defined in claim 2 wherein the surrounding tube layer comprises a refractive index essentially identical to the refractive index of the pure silica core region.

4. An optical fiber as defined in claim 1 wherein D/d<10.

5. A method of forming a single mode fiber for providing transmission of a long wavelength signal less than about 1700 nm, the method comprising the steps of:
   a) providing a glass tube;
   b) depositing a plurality of layers of fluorine-doped silica on the inner wall of the glass tube, the plurality of layers selected to obtain a desired diameter D for a cladding layer;
   c) depositing silica material on the inner wall of the deposited fluorine-doped silica, the amount of silica chosen to obtain a desired core diameter d; and
   d) collapsing the tube to form an optical fiber preform having a core region with a diameter d and a surrounding cladding layer having a diameter D, where D/d is approximately 8.5.

6. The method as defined in claim 5 wherein prior to depositing the plurality of layers of fluorine-doped material, a relatively few layers of phosphorous and fluorine-doped silica are first deposited on the inside of the glass tube.

7. The method as defined in claim 5 wherein prior to depositing the plurality of layers of fluorine-doped material, a relatively few layers of boron and fluorine-doped silica are first deposited on the inside of the glass tube.

8. An optical fiber as defined in claim 1 wherein the D/d ratio is selected such that the ratio of the operating wavelength ($\lambda_{op}$) to the cutoff wavelength ($\lambda_{cut}$) is in the range of $1.0 < \lambda_{op}/\lambda_{cut} < 1.2$.

9. An optical fiber as defined in claim 8 wherein the cutoff wavelength $\lambda_{cut}$ is less than about 1700 nm.

* * * * *